US006858286B1

(12) United States Patent
Simm et al.

(10) Patent No.: US 6,858,286 B1
(45) Date of Patent: Feb. 22, 2005

(54) SUPPLE HANDLE ELEMENT FOR ELECTRIC HANDTOOLS

(75) Inventors: Robert Simm, Oekingen (CH); Urs Ruepp, Solothurn (CH); Mihail Stefanopulos, Solothurn (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/959,261

(22) PCT Filed: Apr. 1, 2000

(86) PCT No.: PCT/EP00/02939

§ 371 (c)(1),
(2), (4) Date: Apr. 15, 2002

(87) PCT Pub. No.: WO00/64642

PCT Pub. Date: Nov. 2, 2000

(30) Foreign Application Priority Data

Apr. 22, 1999 (DE) ........................................ 199 18 118

(51) Int. Cl.[7] ............................. B32B 3/10; B25G 1/01; B62K 21/26; A63B 49/08; A47J 45/00

(52) U.S. Cl. ....................... 428/182; 428/137; 428/138; 428/139; 16/421; 16/430; 81/489; 81/492; 74/551.9; 74/558

(58) Field of Search ................................ 74/551.9, 558; 473/538, 549, 552; 428/182, 139, 137, 138; 16/421, 430; 81/489, 492

(56) References Cited

U.S. PATENT DOCUMENTS

| | | | | | |
|---|---|---|---|---|---|
| 3,016,763 | A | * | 1/1962 | Albert | 74/551.9 |
| 3,489,031 | A | * | 1/1970 | Meier | 74/558 |
| 3,530,739 | A | * | 9/1970 | Meier | 74/552 |
| 4,108,436 | A | * | 8/1978 | Masi | 473/538 |
| 4,953,862 | A | | 9/1990 | Uke | |
| 5,213,913 | A | | 5/1993 | Anthony | |
| 5,618,041 | A | * | 4/1997 | Huang | 473/549 |

FOREIGN PATENT DOCUMENTS

| | | | |
|---|---|---|---|
| DE | 36 25 929 | A1 | 2/1988 |
| DE | G 88 00 465.1 | U1 | 5/1988 |
| DE | 44 33 717 | A1 | 8/1995 |
| DE | 197 03 746 | A1 | 8/1998 |
| DE | 197 03 746 | A | 8/1998 |

* cited by examiner

*Primary Examiner*—Harold Pyon
*Assistant Examiner*—Catherine A. Simone
(74) *Attorney, Agent, or Firm*—Nixon Peabody LLP; David S. Safran

(57) ABSTRACT

In a soft grip element for hand-operated electric machine tools which have a machine housing (10) with a molded-on or attached handle, which has a stiff shell body (18) which is detachably placed machine housing (10) and/or the handle (11), and a coating (19) of soft elastic material which covers the shell body, to form an air reservoir under the surface of the user's hand, in the free surface of the coating (19) a host of recesses (20) is made.

7 Claims, 6 Drawing Sheets

SUPPLE HANDLE ELEMENT FOR ELECTRIC HANDTOOLS

BACKGROUND OF THE INVENTION

The invention proceeds from a soft grip element for hand-operated electric machine tools which have a machine housing with a molded-on handle, machine tools of the type defined in the preamble of claim 1.

A known, shell-shaped soft grip element of this type for an impact drilling machine (DE 197 03 746 A1) is placed on the handle wall, which is used as the contact pressure surface for the operator when working with an impact drilling machine, on the back part of the handle which is molded in one piece onto the machine housing. The soft grip element is connected to the handle via two attachment sites. One attachment site is made as a snap connection in which a tongue molded onto the shell body fits with catch hooks behind a projection on the handle wall. The other attachment site has a bracket which stands away from the shell body transversely to the direction of contact pressure and a correspondingly transversely-running receiving hole on the machine housing, which correspond to one another.

BRIEF SUMMARY OF THE INVENTION

The soft grip element as claimed in the invention with the features of claim 1 has the advantage that due to the dent-like depressions in the grip surface area an air reservoir is formed under the hand which largely reduces the moistening of the hand when working with hand-operated electric machine tools, but at least greatly delays it so that the machine can be kept safe for a much longer time without interruption.

Advantageous developments and improvements of the soft grip element given in claim 1 are possible by the measures cited in the other claims.

According to one preferred embodiment of the invention, a through hole which penetrates the coating and the shell body is made in the base of each of at least some of the depressions. These through holes allow air to circulate under the surface of the hand, dissipating moisture and sweat. This effect is further intensified by the operator, while working with the hand-operated electric machine tool, unconsciously varying the contact pressure on a continuous basis, by which in the soft elastic coating a type of pump action is produced which supports the air circulation through the through holes.

According to one advantageous embodiment of the invention the through holes in the shell body are lined with the soft elastic material of the coating and the material linings of at least part of the through holes preferably project over the surface of the shell body like a collar. The shell body rests on the handle with these material collars. The soft grip element is held more or less floating on the handle and thus the described pump effect is greatly intensified by these structural measures.

A further increase of the pump effect arises when according to another embodiment of the invention there is a layer of breathable material between the shell body and the handle and the shell body with its material collars is supported on the layer. The breathable layer is made interchangeable to maintain its air permeability and is commercially available as a replacement part.

BRIEF DESCRIPTION OF THE DRAWINGS

The invention is detailed below using the embodiments shown in the drawings in the following description.

DETAILED DESCRIPTION OF THE PREFERRED EMBODIMENT

Figure 1:
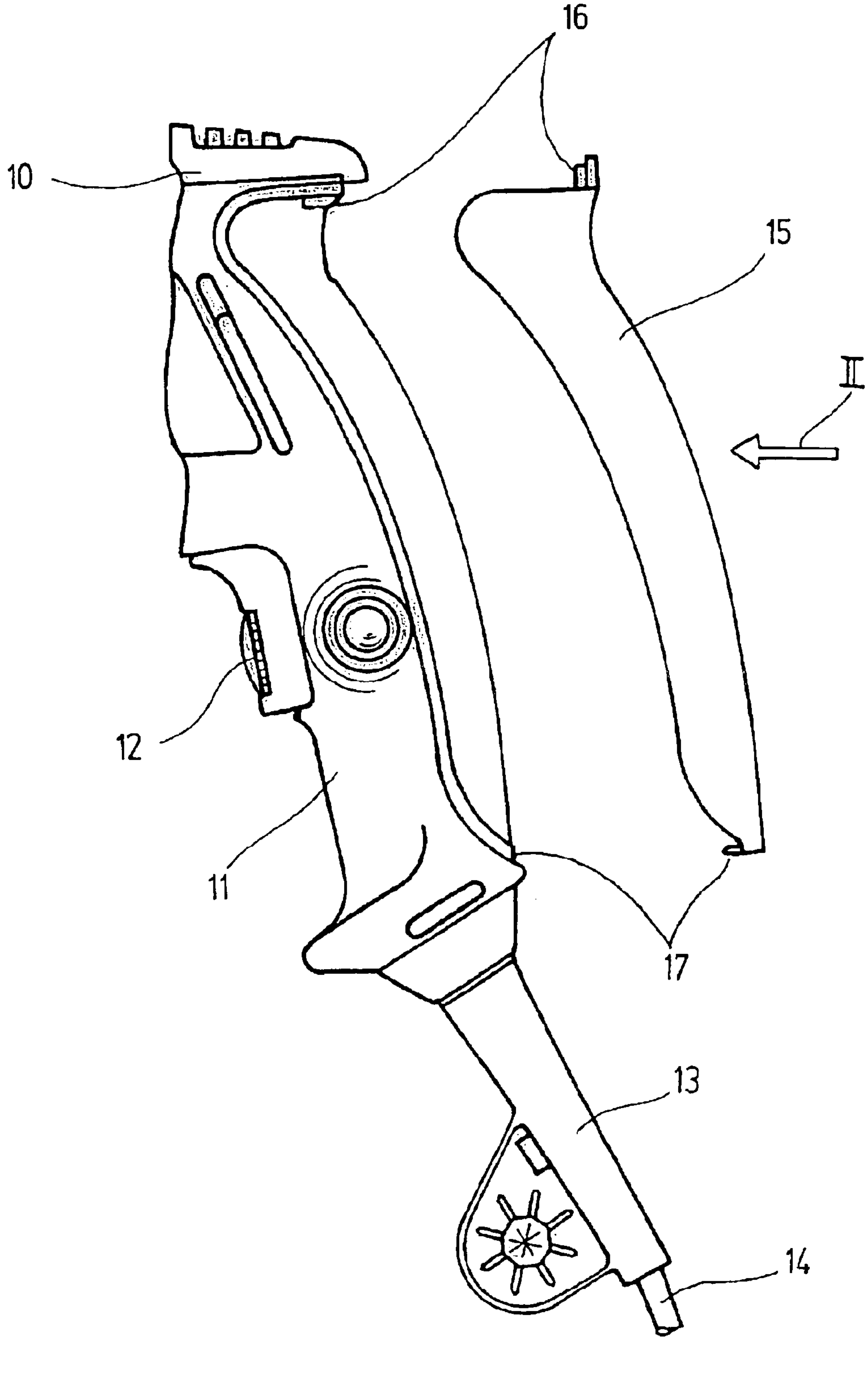
FIG. 1 shows a side view of a handle for the machine housing of a hand-operated electric machine tool and a soft grip element withdrawn from the handle.
Figure 2:
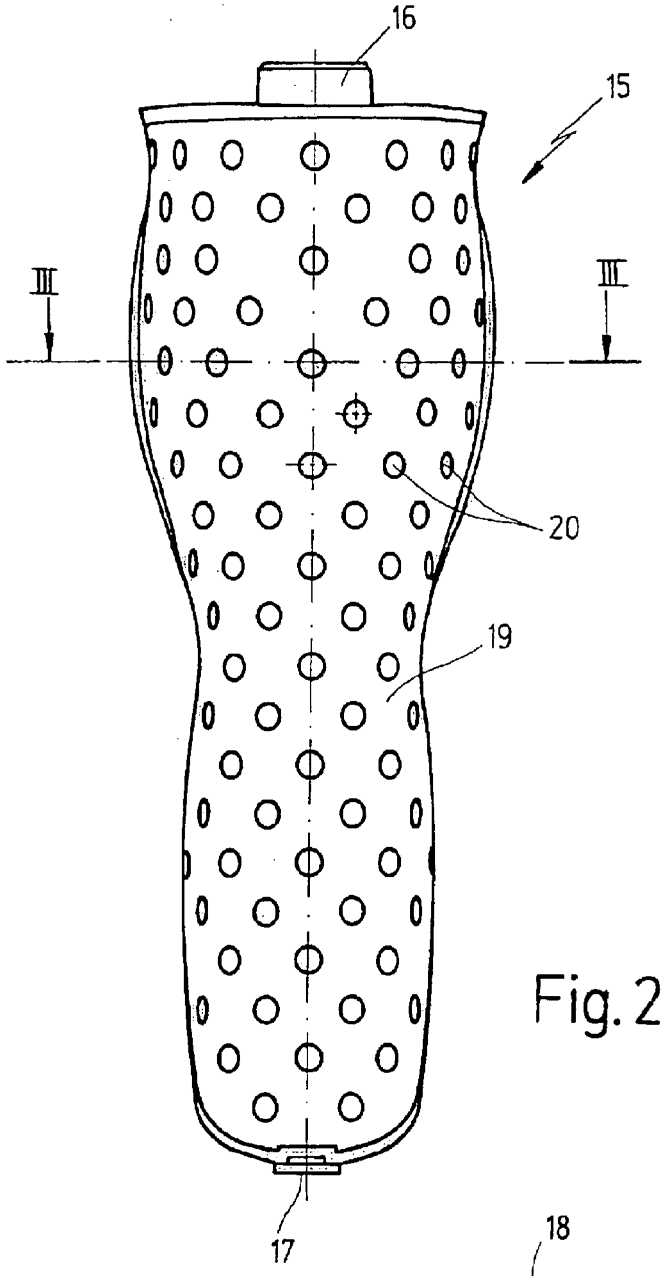
FIG. 2 shows a view of the soft grip element in the direction of arrow II in FIG. 1.

FIG. 1 shows by way of extract the machine housing 10 of a hand-operated electric machine tool, for example an impact drill, in a side view, to which a handle 11 is attached or, like here, is molded on in one piece in the manner of a pistol grip. The machine housing 10 and the handle 11 are composed of two shells, in the conventional manner. In the handle 11 is a switch for turning the drive motor on and off, which motor can be controlled via a push button 12 which projects on the front of the handle 11. On the free end of the handle 11 a reinforcing sleeve or bush 13 of rubber for the connecting cable 14 is attached. The pistol grip-like shape of the handle 11 allows the user to apply a contact pressure in the direction of tool advance, the back of the handle 11 being used as the contact pressure surface. A soft grip element 15 is placed on this part of the handle 11 and is detachably mounted on the machine housing 10 or on the handle 11 via two attachment sites 16, 17 which are made as snap or catch connections.

Figure 3:
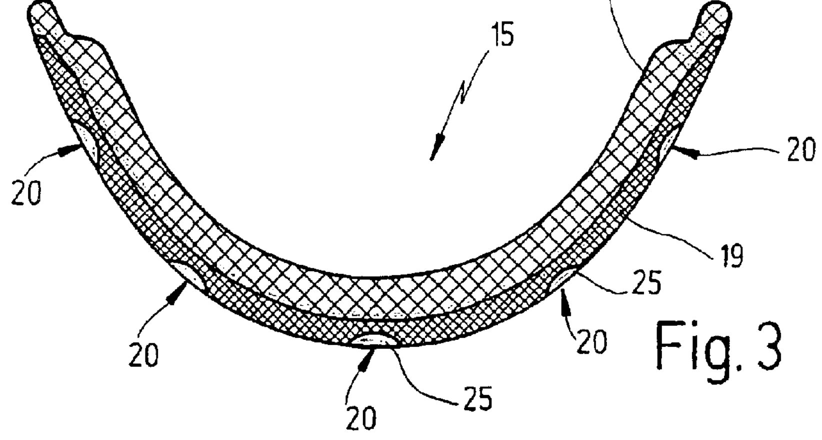
FIG. 3 shows a section along line III—III in FIG. 2, FIGS. 4 and 5 each show the same representation as in FIG. 3 of a soft grip element according to a two additional embodiments.

As can be seen especially from FIG. 3, the soft grip element 15 consists of a stiff, plastic shell body 18 which lies on the handle wall 111 in the area of the back of the handle 11, and of a coating 19 of soft elastic material which completely covers the shell body 18 on its back facing away from the handle 11. In the free surface of the coating 19 which points to the outside a host of recesses 20 is contained which are distributed uniformly over the surface of the coating 19. The depressions 20 in the coating 19 are made as concave spherical caps or dents.

Figure 4:
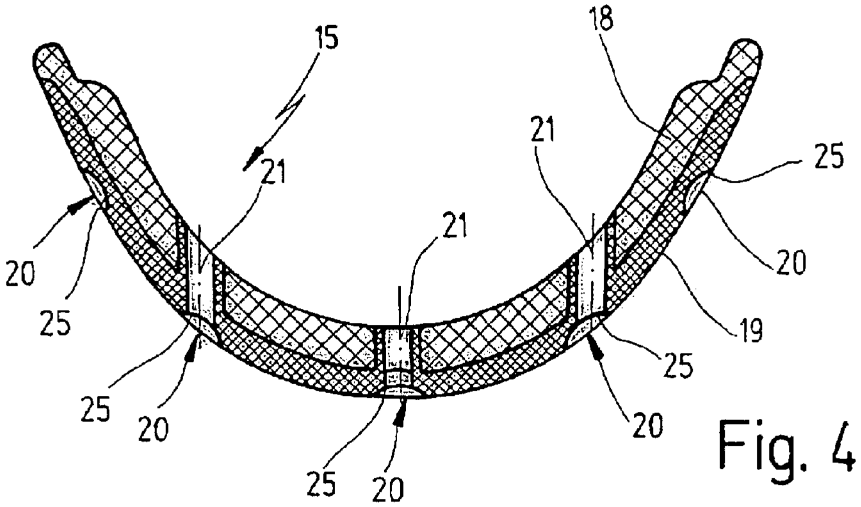

In the modified embodiment of FIG. 4, in the base of some of the depressions 20 in the coating 19 there is a through hole 21 which penetrates the coating 19 and the shell body 18. The through holes 21 are lined with the soft elastic material of the coating 19 in the area of the shell body 18. In the embodiment of FIG. 4, of the five depressions 20 which lie in the cross sectional plane, the middle depression 20 and the two adjacent depressions 10 each have a through hole 21, while the two outer depressions 20 are not provided with a through hole. These through holes 21 enable air circulation of the air reservoir present in the depressions 20 under the surface of the hand, which circulation effectively dissipates moisture and sweat on the hand.

Figure 5:
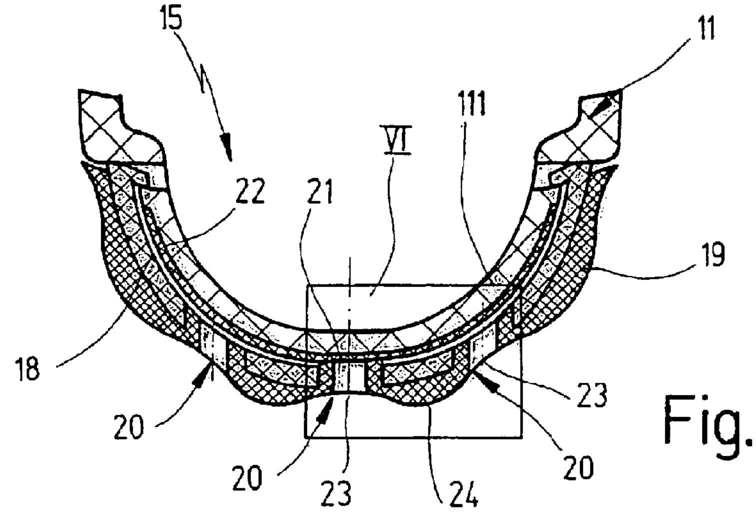
Figure 6:
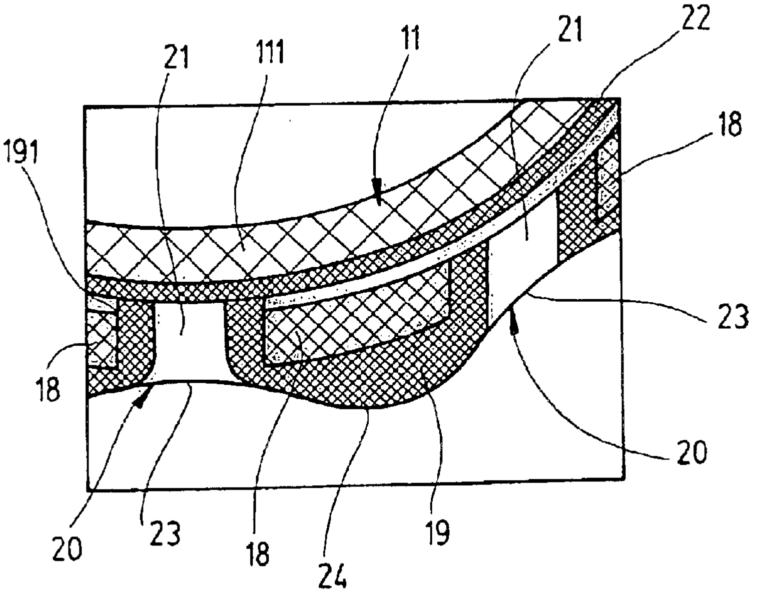
FIG. 6 shows an enlarged view of extract VI in FIG. 5.

In the soft grip element 15 which is shown enlarged in FIG. 5 in cross section and in FIG. 6 in an extract, "floating" support of the soft grip element 15 is accomplished. To do this, the material lining in the through holes 21 is made such that it projects like a collar over the surface of the shell body 18. With these material collars 191 the shell body 18 is supported on the handle wall 11 of the handle 13, between the handle 11 and the shell body 18 there being another layer 22 of breathable material. This layer 22 is made interchangeable and can be withdrawn after removing the soft grip element 15 of the handle 11 from the handle wall 111 and can be replaced by a new layer 22. The floating support of the shell body 18 and the breathable layer 22 improve the air circulation of the air cushion under the hand surface when working with hand-operated electric machine tools so that improved moisture removal is ensured.

As in the embodiment in FIG. 4, in the embodiment shown in FIGS. 5 and 6 there are also the described through holes 21 only in some of the depressions 20. Differently than in the embodiment of FIG. 4, here the depressions are formed by the valleys 23 of corrugations which are molded into the coating 19 alternating with peaks 24 of corrugations such that each corrugation valley 23 in the lengthwise and transverse direction of the coating 19 is embedded between two corrugation peaks 24 at a time. The corrugation valleys 23 and corrugation peaks 24 have a roughly sinusoidal shape.

Figure 7:
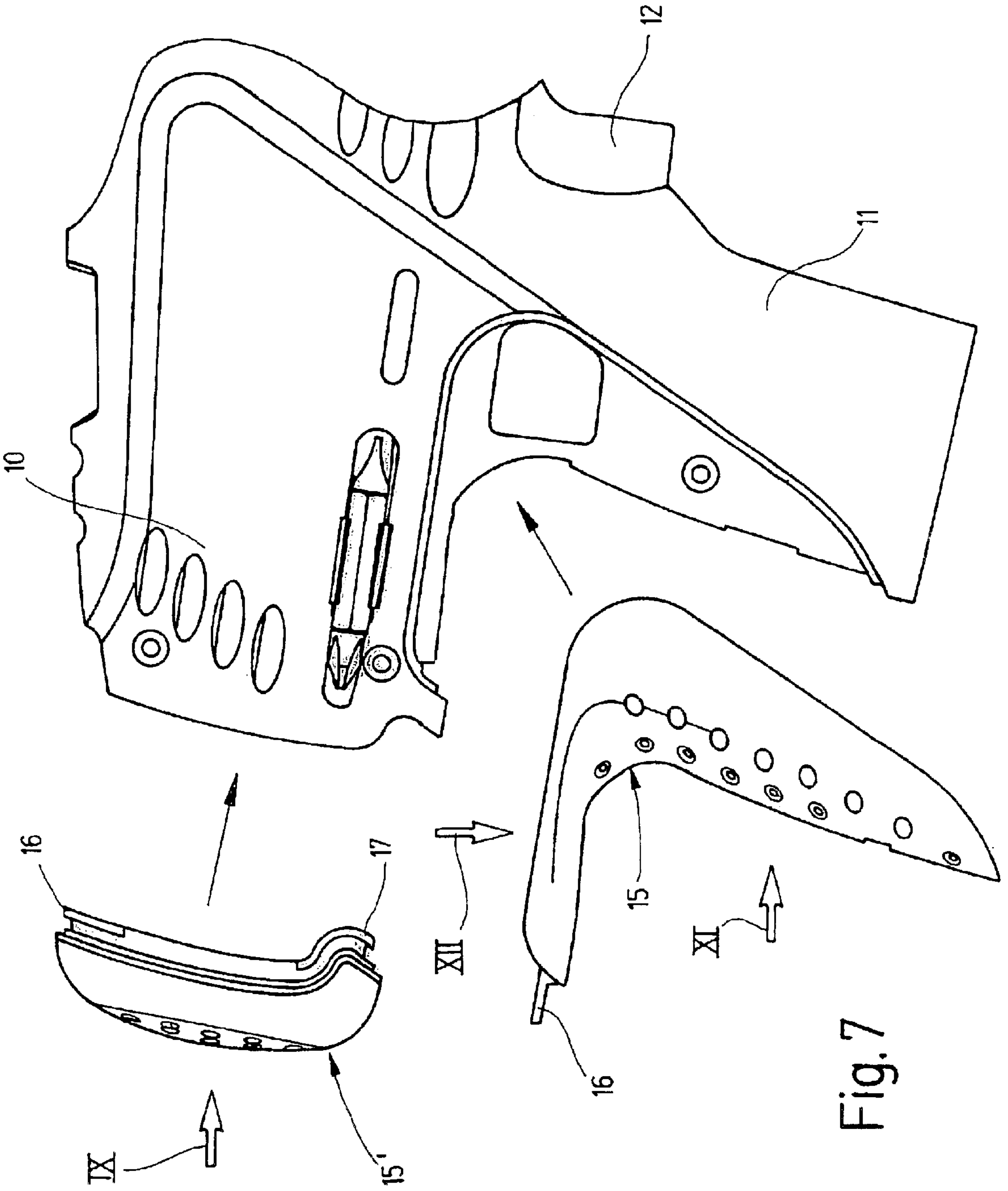
FIG. 7 shows by way of extract a side view of a machine housing of a hand-operated electric machine tool with a handle and soft grip elements removed from the handle and machine housing.
Figure 8:
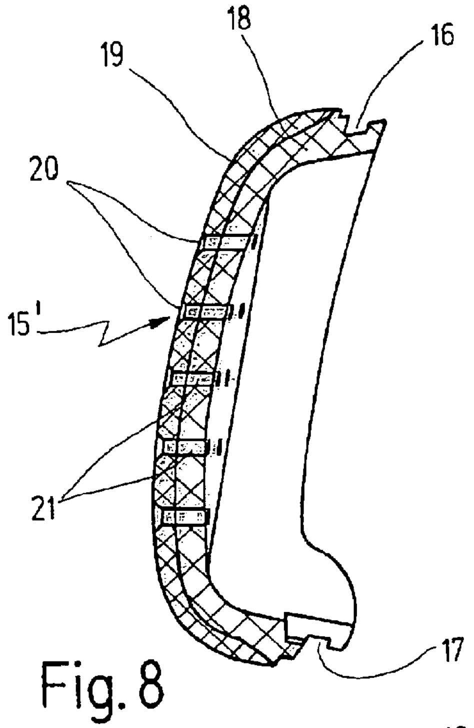
FIG. 8 shows a lengthwise section of the soft grip element which is the top one in FIG. 7.
Figure 9:
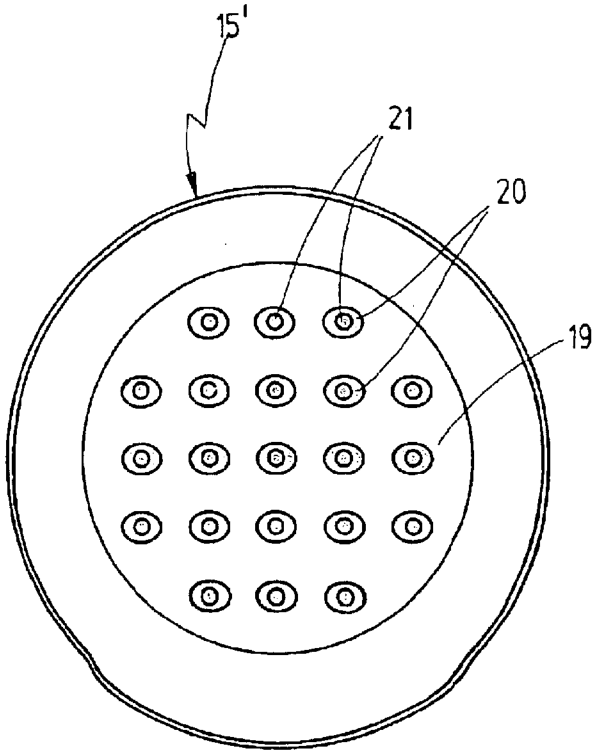
FIG. 9 shows a view of the top soft grip element in the direction of arrow IX in FIG. 7.
Figure 10:
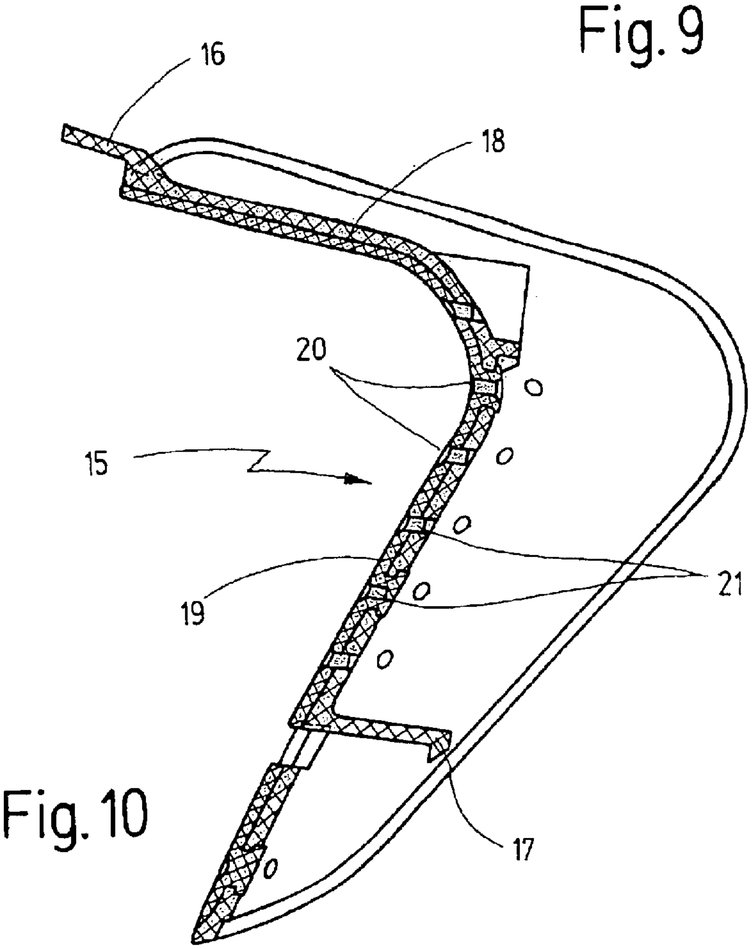
FIG. 10 shows a lengthwise section of the soft grip element which is the bottom one in FIG. 7.
Figure 11:
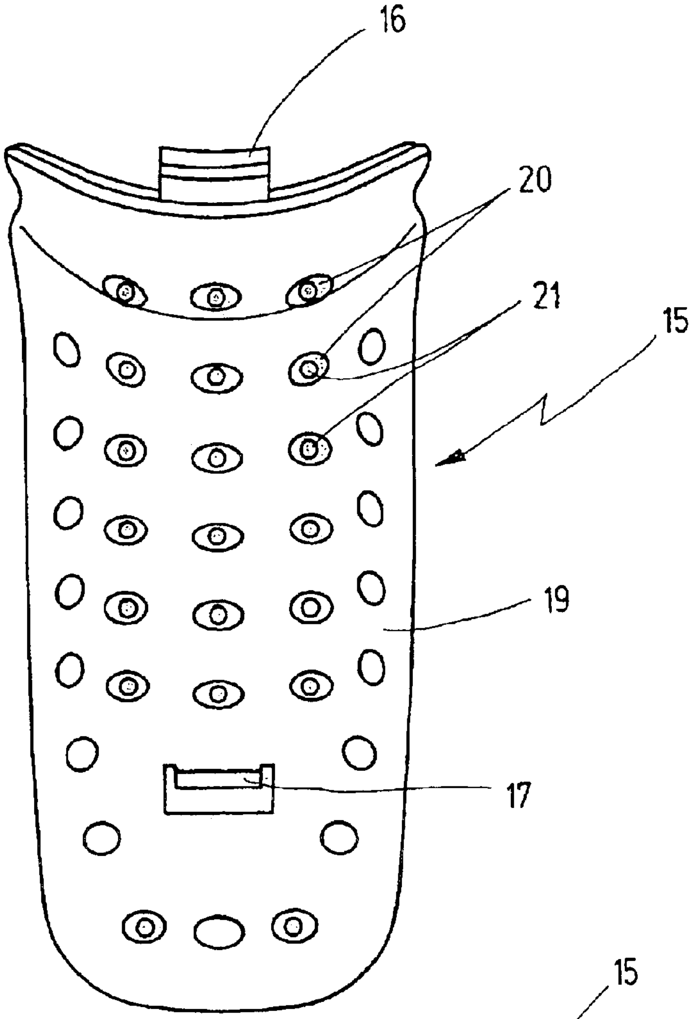
FIG. 11 shows a view of the bottom soft grip element in direction XI in FIG. 7.
Figure 12:
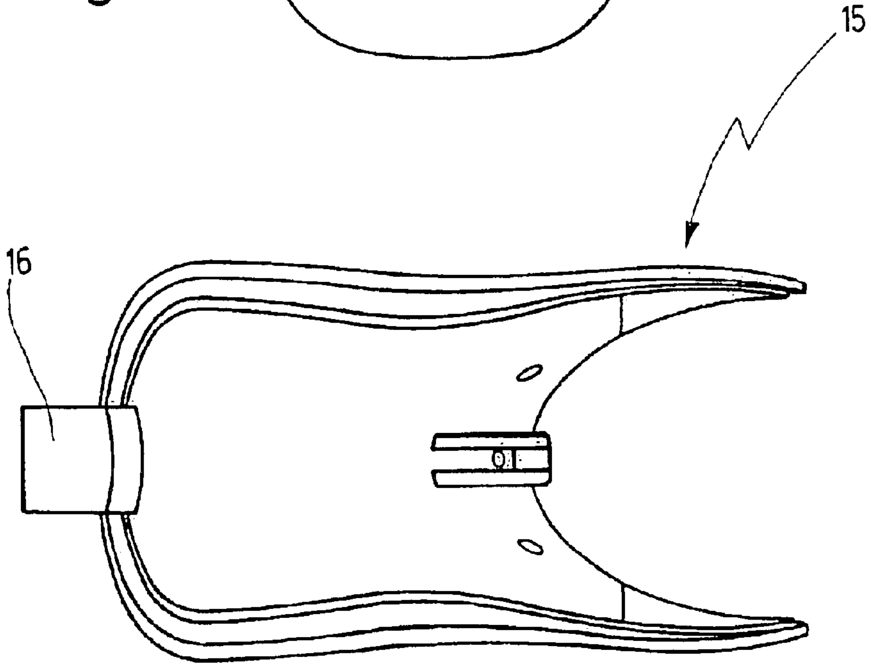
FIG. 12 shows a view of the bottom soft grip element in the direction of arrow XII in FIG. 7.

In many hand-operated electric machine tools, for example, in those with a so-called center handle, the back of the machine housing is also used by the operator as a contact pressure surface in order to apply increased contact pressure to the tool. For these applications it is a good idea to provide the back of the machine housing advantageously with a soft grip element. The figure shows by way of extract a machine housing 10 with the handle 11 of a hand-operated electric machine tool according to another embodiment, in which both a soft grip element 15 can be placed on the handle 11 (bottom figure in FIG. 7) and also a cap-shaped soft grip element 15' can be placed on the back of the machine housing 10 (top figure in FIG. 7). Like the above described soft grip elements 15, the two soft grip elements 15 and 15' are also locked on the handle 11 or on the machine housing 10 at two catch sites 16 and 17 (FIGS. 8 and 10). As can be seen from the cross sections of FIGS. 8 and 10, each soft grip element 15 and 15' consists of a stiff plastic shell body 18 which bears the catch sites 16 and 17, and of a coating 19 of soft elastic material which completely covers the shell body 18 on its back facing away from the handle 11 and the machine housing 10. As in the embodiment of FIG. 4, in the free surface of the coating 19 which points to the outside a host of recesses 19 is contained which are distributed uniformly over the surface of the coating 19 and in the base of the depressions 20 there is one through hole 21 each which penetrates the coating 19 and the shell body 18. The advantages given for the soft grip elements 15 as shown in FIGS. 1–6 are achieved in the same way both for the soft grip element 15' on the back of the machine housing 10 and also for the soft grip element 15 on the back of the handle 11.

What is claimed is:

1. Soft grip element for a hand-operated electric machine tools having a machine housing which includes handle molded or attached to the machine housing, the soft grip element comprising:

at least one stiff shell-shaped body to be detachably placed in contact with the machine housing and/or the handle, and a coating of soft elastic material which covers the shell-shaped body on a surface of the shell body facing away from the machine housing and/or the handle, wherein an exposed surface of the coating contains a plurality of recesess, and some of the recesses include a through hole which extends through the coating and the shell body;

wherein the through holes in the area of the shell body are lined with the soft elastic material of the coating; and wherein in at least some of the through holes the soft elastic material lining in the shell body area projects over the surface of the shell body like a collar such that the shell body will rest upon the material collars when placed on the handle.

2. Soft grip element as claimed in claim 1, wherein the recesses are distributed uniformly over the entire surface.

3. Soft grip element as claimed in claim 1, wherein a layer of breathable material is positioned on the shell body such that the layer of breathable material is between the shell body and the handle with material collars on the shell body supported on the breathable layer.

4. Soft grip element as claimed in claim 1, wherein the shell body is located spaced elastically apart from the machine housing, the shell body being used as a membrane with which by means of the hand of the operator grasping the handle when handling a hand-operated electric machine tool a pump action can develop such that air can be caused to flow through the through holes.

5. Soft grip element as claimed in claim 3, wherein the recesses in the coating are formed by concave spherical caps.

6. Soft grip clement as claimed in claim 3, wherein the recesses in the coating are formed by the valleys of corrugations which are molded into the coating alternating with peaks of corrugations such that each corrugation valley in the lengthwise and transverse direction is embedded between two corrugation peaks at a time.

7. Soft grip element as claimed in claim 3, wherein the layer of breathable material is removable and replaceable.

* * * * *